United States Patent [19]

Guilbert

[11] Patent Number: 4,486,558

[45] Date of Patent: Dec. 4, 1984

[54] ELECTRICAL INSULATING POWDER FOR PROVIDING WIRE COATING

[75] Inventor: Curtis R. Guilbert, St. Paul, Minn.

[73] Assignee: Minnesota Mining and Manufacturing Company, St. Paul, Minn.

[21] Appl. No.: 578,774

[22] Filed: Feb. 9, 1984

[51] Int. Cl.³ .............................................. C08G 59/42
[52] U.S. Cl. .................................... 523/466; 525/107; 525/524; 525/533; 525/908; 525/934; 528/100; 528/103; 528/112
[58] Field of Search ...................... 528/100, 103, 112; 525/524, 533, 934, 107; 523/466

[56] References Cited

U.S. PATENT DOCUMENTS

| | | | |
|---|---|---|---|
| 3,239,537 | 3/1966 | Steckler et al. | 528/100 X |
| 3,269,975 | 8/1966 | Lee | 528/365 X |
| 3,555,111 | 1/1971 | Benham | 525/524 X |
| 3,639,345 | 2/1972 | Whittemore et al. | 525/533 X |

Primary Examiner—Earl A. Nielsen
Attorney, Agent, or Firm—Donald M. Sell; James A. Smith; Gerald F. Chernivec

[57] ABSTRACT

A carboxy-functional curative for epoxy resins comprising the reaction product of trimellitic anhydride and capped epoxy resins, the capped resins comprising a hydantoin diepoxide or a diglycidol ether of bisphenyl A reacted with benzoic acid or phenyl. The curative is used in conjunction with a thermosettable epoxy resin powder composition useful for applying electrically insulating coatings to electrical wire.

10 Claims, No Drawings

ELECTRICAL INSULATING POWDER FOR PROVIDING WIRE COATING

TECHNICAL FIELD

The invention concerns powder which is useful for applying electrically insulating coatings to wire and, more specifically, with a thermosettable epoxy resin powder composition containing a novel adduct as the curative therefor.

BACKGROUND ART

Wires, such as used in the windings of transformers and motors, have been insulated with enamels which are applied from organic solvent, and their application typically involved health, fire and air pollution hazards. To avoid these problems, wire could instead be insulated by kraft paper, but such a process is slow and expensive and undesirably increases the bulk of the wire winding.

To overcome these deficiencies, epoxy resin powders have been designed to provide coatings which exhibit good electrical insulating properties without pollution of the atmosphere. One such powder having found excellent commercial acceptance is that disclosed in U.S. Pat. No. 4,267,300.

This patent is based on an epoxy resin powder which contains a high molecular weight epoxy resin and trimellitic anhydride as the curing agent. It has been found that the anhydride curative provides an excellent combination of stability, adhesion, cure rate, electrostatic properties for the powder, and excellent electrical properties to the cured coating. However, the anhydride has two properties which, if improved, could lead to an even more effective powder for wire coatings. Since trimellitic anhydride is high melting, extreme care is necessary to insure uniform dispersion thereof in the powder. Furthermore, since the anhydride is present in discrete particulate form, problems relating to the homogeneity of the powder can occur, often resulting in the formation of pinholes and resulting low dielectric strength. Also, trimellitic anhydride is relatively toxic, and therefore problems can occur in the manufacture of the powder.

I have now discovered that these deficiencies can be overcome to a large extent by the use of an adduct which is resinous and fusible and which results in high dielectric strength coatings while retaining the foregoing desired physical, chemical and electrical properties of the powder and the resultant cured coating therefrom.

Adducts of trimellitic anhydride have been disclosed in the art to serve as curatives for epoxy resins.

For example, tetracarboxylic acid hardeners were prepared from trimellitic anhydride and dihydric alcohols in U.S. Pat. No. 3,269,975. Adducts based on trimellitic anhydride and polyols having 3 or 4 (or more) hydroxyl groups are disclosed in U.S. Pat. No. 3,555,111. Similarly, another based on trimellitic anhydride and long chain diols is disclosed in U.S. Pat. No. 3,639,345.

All of the aforementioned adducts were apparently developed to impart enhanced flexibility to the cured epoxy resins. They are, however, all based on aliphatic alcohols and polyols, thus failing to impart desired high temperature stability available through use of the present adducts. Additionally, the ring and/or aromatic structure of the present adducts provides improved resin characteristics, important for formulating powder systems.

DISCLOSURE OF THE INVENTION

The novel powder of my invention first comprises an epoxy component which is a polyglycidyl ether of bisphenol A capped with a monobasic aromatic acid, e.g., benzoic acid, or a monobasic aromatic phenol, e.g., phenol, in an amount of from about 1 to about 5 percent by weight of the polyglycidyl ether. The polyglycidyl ether has an epoxide equivalent weight of from about 1200 to about 2200 and an epoxide functionality of from 1.2 to 1.6.

The adduct, which comprises the second component of my formulation, is based on the reaction product of trimellitic anhydride and specific capped epoxy resins. The capped epoxy comprises a hydantoin diepoxide or a diglycidyl ether of bisphenol A reacted with, per mole of epoxy, two moles of benzoic acid or two moles of phenol. This capped epoxy is then reacted with two moles of trimellitic anhydride per mole of capped epoxy, to form the adduct.

While the components noted above are capable of interacting when heated to moderately elevated temperatures, the reaction rate will typically be substantially enhanced by including a catalytic amount of any of a large number of conventional catalysts known to accelerate epoxy/anhydride and epoxy/carboxylic acid interaction. Examples of suitable catalysts include stannous salts, imidazole and its derivatives, tertiary amines and chromium salts. However, the catalyst should be selected from those which will not render the cured coating corrosive or otherwise deleteriously affect electrical insulating properties. Particularly preferred are stannous salts as listed in U.S. Pat. No. 3,477,971, and especially stannous octoate.

The catalyst is preferably utilized in amounts from about 0.1 percent to about 1.0 percent by weight of the polyglycidyl ether. At such amounts, the powder should be storable at room temperature without degradation. Increased catalyst concentration may cause reduction in dielectric properties and shelf life, whereas amounts below about 0.1 percent by weight provide minimum benefit.

When the epoxide equivalent weight of the polyglycidyl ether is at or near 1200, it is preferred that the epoxide functionality be close to 1.2 to space out the crosslinks sufficiently to provide the desired flexibility of cured coated product. Preferably, the epoxide equivalent weight is about 1800 to about 2000 since this provides cured products of increased strength and flexibility. However, above about 2200, the melt viscosity may become unduly high such that coalescence of the fused powder particles may not be sufficiently obtained. While the function of the ester or phenol caps is not fully understood, such appear to have a viscosity-depressing function which enables the epoxide equivalent weight to be unexpectedly high without inhibition of the necessary coalescing characteristics of the fused powder.

As is conventional in the art, the powder preferably contains a flow control agent such as a copolymer of 2-ethylhexyl acrylate and ethyl acrylate. Such a material tends to minimize the formation of pinholes in the cured coatings. Nevertheless, it may still be desirable to apply a second coating over any pinholes which may be contained in the first.

The powder is preferably mixed with finely divided silica to inhibit tendencies for the powder to block during storage and shipment and also to enhance fluidization thereof.

Furthermore, the powder can be pigmented for color-coding purposes and to provide an indication of the degree of cure. Preferably, the pigment is inorganic for thermal stability and chemical resistance. Organic pigments displaying thermal stability are also useful.

In a typical coating operation, a wire to be coated is cleaned and passed through a cloud of electrostatically-charged powder at ordinary room temperature, following which the powder coated wire is heated to a sufficient temperature to fuse and cure the powder.

A large manufacturer of electrical distribution and powder transformers employs a test called the Heat Shock Test to screen prospective insulating coatings. In this test, a coated wire specimen of from 10 to 14 inches in length is bent at a 90° angle over a mandrel having a diameter four times the thickness of the specimen in the direction of bending, and a second portion of the specimen is bent 90° over the mandrel in the opposite direction. Additional specimens are bent to provide at least four 90° bends to screen additional properties thereof. If the wire is not square or round, one wire specimen is bent in the direction of maximum thickness and another in the direction of minimum thickness, again using mandrels having diameters four times each wire thickness.

Each specimen is then placed in an oven at 175° C. for 30 minutes. After cooling to room temperature, the coating is inspected for cracks. Any visible crack constitutes failure. In this test, a range of coating thicknesses of a given powder is also tested. The thickest coating which then provides no visible cracks is an indication of the quality thereof. One leading manufacturer of electrical distribution and power transformers indicates a strong preference for materials which pass this test at thicknesses of at least about 7 mils total, i.e., 3.5 coating thickness.

The invention will now be more specifically described by the following non-limiting examples, wherein all parts are by weight unless noted.

EXAMPLE 1

This example illustrates the preparation of an adduct pf a diglycidyl ether of bisphenol A/phenol/trimellitic anhydride.

Eleven hundred and ninety seven grams of Epon 828, Shell Chemical's designation for a diglycidyl ether of bisphenol A was heated to 60° C. and vacuum treated to remove entrapped air. Then, under a nitrogen atmosphere, 2.25 grams of triphenyl ethyl phosphonium iodide catalyst were added, followed by 684 grams of pre-melted phenol. The temperature was increased to 150° C. and another 2.25 grams of the catalyst were added. The temperature was increased to 170° C. whereupon an exothermic reaction occurred, increasing the temperature to 185° C. When the temperature subsided to 160° C., it was maintained at that temperature for 1 hour; then raised to 200° C. At 200° C., the nitrogen purge was broken, and 1116 grams of trimellitic anhydride were added with strong agitation over a 25 minute period. The reaction mixture was then maintained at 180° C. for 1 hour, followed by subjection to a vacuum of 1 mm Hg for 30 minutes. The resulting product was then poured into an aluminum tray and cooled to a solid, friable resin. Its melt viscosity at 150° C. was 4290 cps, its epoxy equivalent weight was 77,906, and its acid number was 245.

EXAMPLE 2

This example illustrates the preparation of an adduct of a hydantoin epoxide/benzoic acid/trimellitic anhydride.

To 539.8 grams of molten benzoic acid at 140° C. were added 598.3 grams of a hydantoin diepoxide (Ciba Geigy's XU-238) dropwise over 1 hour and 20 minutes, with stirring. The temperature was then increased to 160° C. and maintained for 45 minutes; then increased to 200° C. When 200° C. was reached, the heat was removed and 809 grams of trimellitic anhydride were added over a period of 35 minutes with strong stirring. The reaction was completed by maintaining at 180° C. for 1 hour. The contents were then subjected to a vacuum for 1 mm Hg for 30 minutes and poured into aluminum trays to cool. The solid resinous, friable product had a melt viscosity at 150° C. of 112,800 cps, an epoxide equivalent weight of 76,226 and an acid number of 240.

EXAMPLE 3

This example illustrates the preparation of a powder coating composition.

The following components were dry mixed and then melt mixed in a Haake twin-screw extruder:

| Component | Parts |
| --- | --- |
| High molecular weight bisphenol A-based expoxy resin wherein a portion of the epoxide groups are capped with phenol, (phenol content 1.5 percent by weight), having a 150° C. melt viscosity of 126,000 cps and an epoxide equivalent weight of 2525. | 1000 |
| A melt mixture of 5 percent Fluorad FC-30, a fluorochemical surfactant from the Minnesota Mining and Manufacturing Company and 95 percent of Arakote 3003, tradename for a carboxy terminated polyester commercially available from Ciba-Geigy. | 20 |
| Adduct of Example 1 | 20 |
| Pigment concentrate consisting of 10 percent Cromphtal Red 3B from Ciba-Geigy and 90 percent Epotuf 90-179, a bisphenol A epoxy resin encapped with about 3.0 percent benzoic acid and having an epoxide equivalent weight of 1800, from Reichold Chemical. | 20 |
| Veba B-31, tradename for a phenyl imidazoline catalyst from Vega Chemical | 10 |
| Arakote 3003, a carboxyl terminated polyester from Ciba-Geigy | 267 |

The cooled melt was then passed thru a hammer mill to form a powder, which was then mixed with 0.2 percent by weight Tullanox 500, a fumed silica from Tulco, Inc. and screened thru a 140 mesh screen.

The powder was then coated on No. 10 square aluminum wire via an electrostatic fluid bed. The resulting coating was melted into a smooth film and cured via infrared heat. The total heating cycle was 30 seconds from room temperature up to a final temperature of between 500° and 600° F. The test results obtained on this coated wire are shown below:

Dielectric Breakdown Strength on No. 10 Aluminum Wire Coated At a Film Thickness of 8-12 Mils, in Volts Low: 5,800
High: 8,000
Average: 6,530
(Based on 31 individual measurements)

Heat Shock-Flexibility on No. 10 Aluminum Wire

Pass 13 mils

Dissipation Factor on No. 10 Aluminum Wire At a Film Thickness of 10 Mils

32% at 150° C.

Example 4

This example illustrates preparation of a powder using the adduct from Example 2.

The following components were dry mixed followed by melt mixing in a Haake twin-screw extruder:

| Component | Parts |
|---|---|
| Epotuf 90-179 | 1500 |
| Adduct of Example 2 | 277 |
| Pigment concentrate of Example 3 | 30 |
| Catalyst (mixture of 97 percent stannous octoate and 3 percent Fluorad FC-430) | 10 |

The cooled melt was passed thru a hammer mill to form a powder, then mixed with 0.2 percent by weight Tullanox 500 and screened thru a 140 mesh screen.

The powder was then coated on No. 10 square aluminum wire via an electrostatic fluid bed. The resulting coating was melted into a smooth film and cured via infrared heat. The total heating cycle was 30 seconds from room temperature up to a final temperature of between 550° and 600° F. Tests results obtained on this coated wire are shown below:

Dielectric Breakdown Strength on No. 10 Aluminum Wire Coated At a Film Thickness of 10 Mils, in Volts Low: 4,900
High: 6,400
Average: 5,700
(Based on 37 individual measurements)

Heat Shock-Flexibility on No. 10 Aluminum Wire

Fail 10 mils,
Pass 8 mils

Dissipation Factor on No. 10 Aluminum Wire Coated At a Film Thickness of 10 Mils 5% at 150° C.

I claim:

1. A carboxy-functional adduct capable of acting as a curative for an epoxy resin comprising the reaction production of:
    (a) the reaction product of an epoxy resin selected from an hydantoin diepoxide and a diglycidyl ether of bisphenol A and, per mole of said epoxy resin, 2 moles of a reactant selected from the group consisting of phenol and benzoic acid; and
    (b) 2 moles per mole of said epoxy resin of trimellitic anhydride.

2. A powder suitable for applying electrically insulating coatings to wire comprising a blend of:
    (a) a polyglycidyl ether of bisphenol A capped with a monobasic aromatic acid or a monobasic aromatic phenol in an amount of from about 1 to about 5 percent by weight of said polyglycidyl ether, said capped polyglycidyl ether having an epoxide equivalent weight of from about 1200 to about 2200 and an epoxide functionality of from about 1.2 to about 1.6; and
    (b) a carboxy functional adduct comprising the reaction product of:
        (i) the reaction product of an epoxy resin selected from the group consisting of an hydantoin diepoxide and a diglycidyl ether of bisphenol A and, per mole of said epoxy resin, 2 moles of a reactant selected from the group consisting of phenol and benzoic acid; and
        (ii) 2 moles, per mole of said epoxy resin, of trimellitic anhydride;
    said adduct being present at a concentration such that about 0.9 to about 1.5 equivalents of carboxyl groups are present per capped polyglycidyl ether epoxide equivalent.

3. The powder of claim 2 further including a catalytic amount of a catalyst for accelerating reaction between said capped polyglycidyl ether and said adduct.

4. The powder of claim 2 wherein said catalyst is a stannous salt.

5. The powder of claim 4 wherein said stannous salt is stannous octoate.

6. The powder of claim 2 wherein said blend further comprises a thermally stable pigment.

7. The powder of claim 2 wherein said monobasic acid is benzoic acid.

8. The powder of claim 2 wherein said monobasic aromatic phenol is phenol.

9. The powder of claim 2 wherein said blend further contains a flow control agent.

10. The powder of claim 2 wherein said blend further contains finely divided silica.

* * * * *